United States Patent [19]
Yamaoka et al.

[11] Patent Number: 5,180,535
[45] Date of Patent: Jan. 19, 1993

[54] INJECTION MOLDING OF STYRENE RESIN

[75] Inventors: Ikuro Yamaoka; Masao Kimura, both of Kawasaki, Japan

[73] Assignee: Nippon Steel Corporation, Tokyo, Japan

[21] Appl. No.: 481,597

[22] Filed: Feb. 20, 1990

[51] Int. Cl.$^5$ .................. B29B 11/08; B29K 9/06; B29C 45/73
[52] U.S. Cl. .................. 264/328.16; 264/328.17; 264/331.13
[58] Field of Search .................. 264/328.17, 328.16, 264/331.13

[56] References Cited

U.S. PATENT DOCUMENTS

| | | | |
|---|---|---|---|
| 3,009,206 | 11/1961 | Salyer et al. | 264/328.16 |
| 4,386,188 | 5/1983 | Grancio et al. | 264/328.17 |
| 4,836,960 | 6/1989 | Spector et al. | 264/328.16 |

FOREIGN PATENT DOCUMENTS 62-91518  4/1987  Japan .

Primary Examiner—Jan H. Silbaugh
Assistant Examiner—A. Y. Ortiz
Attorney, Agent, or Firm—Wenderoth, Lind & Ponack

[57] ABSTRACT

A method of injection molding a styrene resin or a composition thereof, which includes injection molding a molten molding resin material of a styrene-conjugated diene block copolymer containing 50 to 90% by weight of a styrene polymer or a molten molding resin material of a resin composition comprising 50% by weight or more of the styrene-conjugated diene block copolymer and 50% by weight or less of a styrene resin other than the styrene-conjugated diene block copolymer, wherein the molten resin is injected and filled into a mold with a wall surface temperature at core and cavity portions within the mold being made 110° to 180° C., and the molded product is demolded when the wall surface temperature of the core and cavity portions is lowered to the glass transition temperature or lower of the styrene polymer moiety in the block copolymer. The obtained molded product has a high impact resistance.

5 Claims, No Drawings

INJECTION MOLDING OF STYRENE RESIN

BACKGROUND OF THE INVENTION

1. Field of the Invention

This invention relates to a method of obtaining a high impact resistant product injection molded from an injection molding material of a styrene-conjugated diene block copolymer with a high styrene content, or a molding material of a resin composition containing a styrene resin other than the styrene-conjugated resin copolymer dispersed in the styrene-conjugated diene block copolymer.

2. Description of the Related Art

In general, styrene-conjugated diene block copolymers with styrene contents of 50% by weight or lower are used as thermoplastic elastomers, and used as modifiers for the general purpose resins and engineering plastics, or base polymers for tackifiers and adhesives ("8883 Chemical Commercial Products", p. 667, Kagaku Kogyo Nipposha (1983). On the other hand, styrene-conjugated diene block copolymers with styrene contents of 50% by weight or more have been used widely as thermoplastic resins (transparent impact resistant polystyrenes) and as alternative for other transparent resins such as PVC resins, PMMA resins, AS resins, MBS resins, and PC resins, or raising the quality of opaque impact resistant resins such as HIPS resins, PP resins, etc. have hitherto been used transparent (Asahi Chemical, Technical Report of ASAFLEX, "Specific Features and Applications of ASAFLEX" p. 78). Among these resins, PVC resins are flame retardant but have a low impact resistance, and a blending of MBS resins is widely practiced to cover the drawback without impairing transparency ("8683 Chemical Commercial Products", p. 527, Kagaku Kogyo Nipposha (1983)). The use of expensive MBS resins, however, increases the cost of the molding material, and a drawback arises in that the disposal of waste materials is difficult so long as PVC resins are employed. This is the reason for using, as a substitute, styrene-conjugated diene block copolymers which are transparent impact resistant polystyrenes, so long as use conditions are allowed. On the other hand, where PMMA resins and AS resins are employed, improvement impact resistance is important, and where MBS resins and PC resins are employed, reduction in cost is important. When obtaining an injection molded product by using such styrene-conjugated diene block copolymers, usually a molding material is injected into an injection molding machine and the molten resin charged into the mold maintained at a temperature lower than the glass transition temperature of the styrene polymer moiety in the block copolymer, to obtain a molded product.

In this injection molding method, however, the impact resistance of the molded product is still too low, and to further expand the use thereof an improved method of obtaining further higher impact resistance while maintaining the transparency of the molded product is required. The present inventors disclosed in Japanese Unexamined Patent Publication (Kokai) No. 62-91518 that the microphase structure of the styrene-conjugated diene block copolymer must be maintained at a specific orderly structure, to obtain high impact resistance, and a desired stable high impact resistance cannot be obtained even when a specific styrene-conjugated diene block copolymer is injection molded, unless the orderly structure of said block copolymer is made optimum. If the molding of this copolymer is carried out by the compression molding method, with a very low shear rate applied to the molten resin and an orientation of the microphase structure caused thereby, a final molded product having an optimum orderly structure with a very high impact resistance can be obtained. The compression molding method, however, has a low productivity, and a high cost as a method of molding styrene-conjugated diene block copolymers. On the other hand, when the injection molding method generally employed in the industry is used, an highly developed oriented layer is formed near the surface of the molded product due to the influence of the high shear rate during molding, and the microphase structure within the layer is cooled while being oriented, whereby the orderly structure is greatly disturbed, and therefore, it is very difficult to maintain a desirable orderly structure in the final molded product. Therefore, only low Izod impact values are usually obtained in the injection molded products using of the molding material of this copolymer, and a problem arises in that impact resistance is too low for use as substitute for other transparent resins.

It is known to reinforce a styrene-conjugated diene block copolymer with a styrene content of over 50% by weight as the matrix with a styrene type resin (for example, Japanese Examined Patent Publication (Kokoku) No. 60-26429; Koichi Inoue, Plastics, 35(9), 61 (1984), etc.). In this case, dry blending is practiced in the prior art by formulating various styrene resins in styrene-butadiene block copolymers, and after melt blending by a kneading extruder, if desired, the composition is pelletized, the pellets are charged into an injection molding machine, and the molten resin is injected into a mold maintained at a temperature lower than the glass transition temperature of the styrene polymer moiety in the styrene-butadiene block copolymer to obtain a molded product. This is the most widely used modification process.

According to this modification process, however, although the rigidity and heat resistance of the molded product can be improved, but impact resistance is still unsatisfactory in practical application, and to further expand its use, a greatly improved method is required. The present inventors disclosed in Japanese Unexamined Patent Publication (Kokai) No. 62-91518 that to obtain a high impact resistance, both of the styrene-butadiene block copolymer which forms the matrix and the styrene resin other than said styrene-butadiene block copolymer must keep a specific dispersed state and orderly structure, and even when a specific styrene-butadiene copolymer and a specific styrene resin are used and mixed at a predetermined composition ratio, a desired impact resistance cannot be obtained unless the dispersed states and orderly structures of the styrene-butadiene block copolymer which forms the matrix in the composition and the styrene resin other than the block copolymer are made optimum. Accordingly, the present inventors considered that a final molded product having a high impact resistance could be obtained even by using of the process of the prior art of injection molding after kneading and extrusion of a dry blended product, if the dispersed states and orderly structures of the respective resins are made optimum during kneading and extrusion, and care is taken not to lose the optimum dispersed states and orderly structures during molding. Concerning the kneading and extrusion steps, the present inventors have already filed a patent application relating to a method of preparing pellets, in which the styrene-butadiene block copolymer which forms the matrix and the styrene resin other than the block copolymer keep the most suitable dispersed state and orderly structure (Japanese Unexamined Patent Publication (Kokai) No. 63-278952). When molding such pellets, if molding is performed by the compression molding method with a very low shear rate applied to the molten resin, and an orientation of the matrix and the dispersed phase caused thereby, since the dispersed state and orderly structures in the pellets are substantially preserved, a final molded product having a very high impact resistance can be obtained. The compression molding method, however, has a low productivity and is not practical as the method of molding styrene resin compositions. On the other hand, when the injection molding method generally practiced in industry is used, due to the influence of a high shear rate during molding, an extremely developed oriented layer is formed near the surface of the molded product, and both the matrix and the dispersed phase within the layer are cooled while being oriented, whereby the dispersed state and the orderly structure are greatly disturbed. As a result, it is very difficult to maintain a desirable dispersed state and orderly structure in the final molded product, and a problem arises in that the Izod values of the injection molded product using the pellets are generally low.

SUMMARY OF THE INVENTION

To solve the problems as mentioned above accompanied an object of the present invention is to minimize the shear stress applied to the molten resin during injection molding, thereby making the thickness of the oriented layer formed near the surface of the molded product as thin as possible.

The present invention provides a method of the injection molding of a styrene resin or a composition thereof, which comprises injection molding a molten molding resin material of a styrene-conjugated diene block copolymer containing 50 to 90% by weight of a styrene polymer or a molten molding resin material of a resin composition comprising 50% by weight or more of said styrene-conjugated diene block copolymer and 50% by weight or less of a styrene resin other than said styrene-conjugated diene block copolymer wherein, in one molding cycle, the molten resin is injected into a mold with the wall surface temperature at the core and cavity portions within the mold with which the filled resin is in direct contact being made 110° to 180° C., and the molded product is demolded when the wall surface temperature of the core and cavity portions is lowered to the glass transition temperature or lower of the styrene polymer moiety in said block copolymer. According to the injection molding method of the present invention, it is possible to obtain an injection molded product having a high impact resistance with a higher Izod impact value, as compared with the injection molded product of the prior art obtained by maintaining the mold temperature at a temperature lower than the glass transition temperature of the styrene polymer moiety in said block copolymer.

DESCRIPTION OF THE PREFERRED EMBODIMENTS

The block copolymer used in the present invention may be a radially branched or linear type. The radially branched type block copolymer is represented by the formula X–(B—S)$_m$, and the linear block copolymer is represented by the formula S–(B—S)$_n$B—S or S–(B—S)$_n$B. Here, S is a polymer block comprising styrene; B is a polymer block comprising primarily a conjugated diene, and may be also a conjugated diene polymer or a conjugated diene-styrene random copolymer; X represents the portion of a polyfunctional coupling agent used for formation of the radially branched type polymer from which all the functional groups are eliminated; m is an integer of 3 or more representing the number of the functional groups of the polyfunctional coupling agent; and n is 0 or an integer of 1 or more representing the number of recurring units.

The block copolymer used in the present invention must assume, in the solid state, a microphase separation structure in which the agglomerated layer of a polymer block comprising styrene and the agglomerated layer of a polymer block comprising primarily a conjugated diene are alternately laminated, and accordingly, the styrene content in the block copolymer is preferably 50 to 90% by weight, including the styrene contained in the B block and the S block. When thus formed, the styrene-conjugated diene block copolymer used in the present invention will readily assume the alternate layer shape as mentioned above, whereby the desired improvement of impact resistance can be obtained. In the case of injection molding, the microphase separation structure of the styrene-conjugated diene block copolymer is formed via the phase separation process when the block copolymer is cooled within the mold from the molten state to the solid state. When the styrene content in the block copolymer is less than 50% by weight or more than 90% by weight, even if the phase separation process is controlled, and the structure may be frozen at any stage of the phase separation process, the microstructure of the block copolymer cannot assume the alternate layer shape as mentioned above, and thus a high impact resistance cannot be obtained.

The block copolymer to be used in the present invention may be prepared by an anion living polymerization technique, but those prepared by other known preparation methods may be also used. The preparation conditions may be known in the art for both the radially branched type block structure and the linear block structure.

The conjugated diene referred to herein includes, for example, 1,3-butadiene, 2-methyl-1,3-butadiene (isoprene), 2,3-dimethyl-1,3-butadiene, 1,3-pentadiene, and 1,3-hexadiene. Preferably 1,3-butadiene and isoprene are employed, and may be used alone or as a mixture of two or more kinds thereof.

In the present invention, when the molding material of a resin composition is used, the styrene resin which forms the dispersed phase in the molding material can be polystyrene, a copolymer of styrene with a styrene derivative such as o- or m- or p-methylstyrene, α-methylstyrene, dimethyl styrene, a copolymer of styrene with a methacrylate ester, maleic anhydride, and acrylonitrile, an impact resistant polystyrene modified with a rubber, a styrene-conjugated diene block copolymer with a styrene content of 70% by weight or more, or an acrylonitrile-styrene-butadiene copolymer. These styrene resins may be also used as a blend of two or more thereof. Any desired preparation conditions known in the art can be used for these styrene resins, but to obtain a polymer which can be easily injection molded, the number average molecular weight must be within the range of from 10,000 to 500,000.

In the present invention, when a molding material of a resin composition is used, the formulation ratio of the styrene-conjugated diene copolymer is 50% by weight or more, and that of the styrene resin other than this styrene-conjugated diene block copolymer must be 50% by weight or less. This restriction is imposed because substantially no improvement can be obtained unless the phase of the block copolymer forms the matrix.

In the present invention, as the method of blending the styrene-conjugated diene block copolymer with a styrene resin other than said styrene-conjugated diene block copolymer, various blending methods are possible, but since both the styrene-conjugated diene block copolymer and the styrene resin other than said styrene-conjugated diene block copolymer must be maintained at specific dispersed state and orderly structure, a mere dry blending is impossible, and a melt blending or solution blending is preferable. The specific dispersed state and orderly structure are those shown in claim (3) of Japanese Unexamined Patent Publication (Kokai) No. 62-91518. Namely, it is a configuration in which the phase of the styrene-conjugated diene block copolymer which forms the matrix assumes a microphase separation structure of the agglomerated layer of a polymer block comprising styrene and the agglomerated layer of a polymer block comprising conjugated diene each with a layer thickness of 0.01 to 0.05 $\mu$m laminated alternately, and 25% by volume of the whole styrene resin other than this styrene-conjugated diene block copolymer is dispersed in particles of 0.1 to 1.0 $\mu$m in diameter. Provided that such a specific dispersed state and orderly structure can be obtained, the kneading machine to be used for melt blending may be rolls, a Banbury mixer, various mills, a screw type extruder, and other mixers or blenders, but preferably a kneading machine equipped with an extrusion function capable of extruding into a molding material having a shape and size which can be charged finally into the injection molding machine with ease is used. When a direct melt blending is difficult, for example, when there is a difference of 10 degrees or so in the melting or plastifying temperature, or when the melting viscosities are very different, solution blending is employed. Namely, blending is effected by previously mixing and dispersing the components into a dispersing medium, and the blended product may be separated without impairing the blended state.

Preferably, the mold to be used in the present invention is subjected, in its design stage, to an adequate pressure gradient design in the direction for shortening the lengths of the sprue-runner portion, the gate portion for avoiding excessive pressure loss during flowing of the resin into the mold, and a flow balance design able to effect a uniform filling within the cavity by using a flow analysis system of the resin injected into the mold. This is because an excessive pressure loss promotes a disturbance of the dispersed state and orderly structure of each phase in the molten resin, by increasing the shear rate, and because a poor flow balance creates an excessively filled portion or a portion with a high internal stress level, whereby the thickened resin after filling flows to promote also disturbance of the dispersed state and orderly structure of each phase. Further, to obtain a uniform and quick temperature rise and fall of the resin filled within the mold, the cooling pipe arrangement and dimensions should be designed by using of a system able of optimizing the cooling pipe arrangement and water passage conditions.

To lower the shear rate applied to the resin flowing through the sprue-runner portion and the gate portion in the mold, the injection rate is preferably lowered such that the resin pathway is not narrowed by the solidified resin near the wall surface, and accordingly, a hot runner mold or semi-hot runner mold may be used. The gate is a portion with the smallest resin pathway cross-section area within the mold of which the shear rate applied to the resin flow becomes the maximum, and therefore, the design of the size and shape is very important. In the case of a hot runner, since the resin is not cooled until reaching the gate portion, the shear rate can be lowered by lowering the injection rate, but care is necessary when determining the gate size and shape, because there is not a degree of freedom as great as in a cold runner. In the case of a semi-hot runner which uses a hot runner for an intermediate part in the process, a cold runner for the short distance to the core and cavity portions, and a conventional gate at the contact point with the core and cavity portions, the degree of freedom is great and therefore adequate design of the gate portion can be done with ease. In either case, when a hot runner is used, the stagnant portion of the resin must be made as small as possible, to avoid deterioration of the styrene-conjugated diene copolymer or a change in the dispersed state due to association of domains of the styrene resin in the dispersed phase.

In the present invention, the injection and filling conditions during the injection molding of the styrene-conjugated diene block copolymer must be such that the shear rate applied to the molten resin during injection and filling is as small as possible, to suppress the great disturbance of the orderly structure due to the orientation of the resin phase which occurs near the surface of the molded product. Also, in the present invention, the injection and filling conditions during injection molding of a molding material of a resin composition must be such that the shear rate applied to the molten resin during injection and filling is as small as possible, to suppress the disturbance in dispersibility or shape of the styrene-conjugated diene block copolymer phase forming the matrix in the molding material and the styrene resin phase other than this styrene-conjugated diene block copolymer, and great disturbance of the dispersed state and orderly structure due to the orientation of the respective resin phases which occurs near the surface of the molded product.

Thus, when the molding material is a styrene-conjugated diene block copolymer or a resin composition thereof, the injection pressure and the injection rate are preferably as low as possible, and the filling time made longer accordingly, provided that defects such as short shot, sink mark, are not observed. The barrel temperature is preferably 180° to 250° C., more preferably 200° to 240° C. If the barrel temperature is lower than 180° C., the viscosity of the resin within the barrel is high, and a short shot may occur if the injection pressure and injection rate are lowered. If exceeding 250° C., a thermal deterioration of the conjugated portion in the block copolymer will occur at an early stage.

In the present invention, during the injection of a molding material into the mold, the temperature of the core and cavity portions is set within the range of from 110° to 180° C. When the temperature of the core and cavity portions within the mold is lower than 110° C., the oriented layer formed near the surface of the molded product becomes thicker, whereby the impact resistance is lowered. If exceeding 180° C., the cooling of and heating the mold after demolding of the molded product again to the original temperature takes a long time, whereby the productivity is undesirably lowered. To obtain molded products without a lowering of the productivity, and having a high impact resistance, the wall surface temperature is preferably from 120° to 160° C. Also, the cooling speed after the resin is filled in the mold is preferably 0.3° C./sec. or more, more preferably 1° C./sec. or more, to make the molding cycle faster.

In the present invention, after filling the resin in the mold, the core and cavity temperature must be lowered to a glass transition temperature of the styrene polymer moiety in said block copolymer, or lower, before demolding the molded product. Where the temperature of the core and cavity portions is higher than the glass transition temperature, the molded product is not hardened, and thus the core and cavity shapes cannot be transferred onto the molded product. Since the glass transition temperature of the styrene polymer moiety in said block copolymer is between 90° and 105° C. in most cases, the temperature of the core and cavity portions during demolding of the molded product is set at 90° C or lower.

In the present invention, within the range which does not impair the effect of the present invention, various additives can be added. For example, styrene resins such as styrene-butadiene block copolymers with styrene contents not higher than 50% by weight, HIPS resins, and ABS resins, and various stabilizers, lubricants, plasticizers, and pigments can be added.

The present invention is described below in more detail with reference to Examples, which in no way limit the present invention. In the Tables showing the Examples and Comparative Examples, the mark * indicates that the impact values could not be measured because of short shot.

EXAMPLE 1

Pellets of K-resin KRO 5 (trade name, Phillips Petroleum, U.S.A.) which is a radially branched styrene-butadiene block copolymer containing 75.5% by weight of styrene and having a glass transition temperature of the styrene polymer moiety of about 95° C., were charged into an in-line screw type injection molding machine with a screw diameter of 40 mm, a theoretical injection volume of 250 $cm^3$, clamping force of 100 tons, and injected at a barrel temperature of 240° C., and the injection pressure and rate as shown in Table 1. The wall surface temperature at the core and cavity portions within the mold was made 150° C. during the injection and filling, and was cooled immediately after completion of the filling at a cooling rate of about 1° C./sec. to 40° C., before demolding the molded product. Izod impact test strips with ¼ inch thickness were V-notched, and the impact values were measured according to ASTM D-256. The results are shown in Table 1.

COMPARATIVE EXAMPLE 1

Pellets of the same K-resin as used in Example 1 were charged into the injection molding machine used in Example 1 and injected at a barrel temperature of 240° C. and the injection pressure and rate shown in Table 1. The wall surface temperature of the core and cavity portions within the mold was made 40° C., which was constantly maintained during the molding step. Injection molded test strips were obtained and the Izod impact values were measured by the same method as in Example 1. The results are shown in Table 1.

EXAMPLE 2

Pellets of Asaflex 810 (trade name, Asahi Chemical, Japan), which is a linear styrene-butadiene block copolymer containing 70% by weight of styrene and having a glass transition temperature of the styrene polymer moiety of about 95° C., were charged into the injection molding machine used in Example 1 and injected at a barrel temperature of 240° C. and the injection pressure and rate shown in Table 2. The wall surface temperature at the core and cavity portions within the mold was made 150° C. during the injection and filling, and cooled immediately after completion of the filling at a cooling rate of about 1° C./sec. to 40° C. before demolding the molded product. Injection molded test strips were obtained and the Izod impact values were measured by the same method as in Example 1. The results are shown in Table 2.

COMPARATIVE EXAMPLE 2

Pellets of the same Asaflex 810 as used in Example 2 were charged into the injection molding machine used in Example 1 and injected at a barrel temperature of 240° C. and the injection pressure and rate shown in Table 2. The wall surface temperature of the core and cavity portions within the mold was made 40° C., which was constantly maintained during the molding step. Injection molded test strips were obtained and the Izod impact values were measured by the same method as in Example 1. The results are shown in Table 2.

EXAMPLE 3

Pellets of a Clearene 730-L (trade name, Denki Kagaku, Japan), which is a linear styrene-butadiene block copolymer (the butadiene block is not a single polybutadiene but a styrene-butadiene random copolymer) containing 76% by weight of styrene and having a glass transition temperature of the styrene polymer moiety of about 95° C., were charged into the injection molding machine used in Example 1 and injected at a barrel temperature of 240° C. and the injection pressure and rate shown in Table 3. The wall surface temperature at the core and cavity portions within the mold was made 150° C. during the injection and filling, and cooled immediately after completion of the filling at a cooling rate of about 1° C./sec. to 40° C., before demolding the molded product. The Izod impact values were measured by the same method as in Example 1, and the results are shown in Table 3.

COMPARATIVE EXAMPLE 3

Pellets of the same Clearene 730-L as in Example 3 were charged into the injection molding machine used in Example 1 and injected at a barrel temperature of 240° C. and the injection pressure and rate shown in Table 3. The wall surface temperature of the core and cavity portions within the mold was made 40° C., which was constantly maintained during the molding step. The Izod impact values of these injection molded test strips are shown in Table 3.

EXAMPLE 4

Pellets of the K-resin Example 1 were charged into the injection molding machine used in Example 1 and injected at a barrel temperature of 240° C. and an injection pressure of 1000 kg/$cm^2$ and an injection rate of 50 cm³ sec. The wall surface temperature at the core and cavity portions within the mold during the injection and filling was as shown in Table 4 and cooled immediately after completion of the filling at a cooling rate of about 1° C./sec. to 40° C., before demolding the molded product. Injection molded test strips were obtained and the Izod impact values were measured by the same method as in Example 1. The results are shown in Table 4.

COMPARATIVE EXAMPLE 4

Pellets of the K-resin used in Example 1 were charged into the injection molding machine used in Example 1 and injected at a barrel temperature of 240° C. and an injection pressure of 1000 kg/cm² and an injection rate of 50 cm³ sec. The wall surface temperature of the core and cavity portions within the mold was made lower than the glass transition temperature of the styrene polymer moiety of K-resin (about 95° C.), as shown in Table 4, which was constantly maintained during the molding step. The Izod impact values of these injection molded test strips are shown in Table 4.

EXAMPLE 5

Pellets of the Asaflex used in Example 2 were charged into the injection molding machine used in Example 1 and injected at a barrel temperature of 240° C. and an injection pressure of 560 kg/cm² and an injection rate of 40 cm³ sec. The wall surface temperature at the core and cavity portions within the mold during the injection and filling was as shown in Table 5 and cooled immediately after completion of the filling at a cooling rate of about 1° C./sec. to 40° C., before demolding the molded product. Injection molded test strips were obtained and the Izod impact values were measured by the same method as in Example 1. The results are shown in Table 5.

COMPARATIVE EXAMPLE 5

Pellets of the Asaflex used in Example 2 were charged into the injection molding machine used in Example 1 and injected at a barrel temperature of 240° C. and an injection pressure of 580 kg/cm² and an injection rate of 40 cm³/ sec. The wall surface temperature of the core and cavity portions within the mold was made lower than the glass transition temperature of the styrene polymer moiety of Asaflex (about 95° C.), as shown in Table 5, which was constantly maintained during the molding step. The Izod impact values of these injection molded test strips are shown in Table 5.

As apparent from Tables 1 to 5, the Izod impact values of the injection molded products obtained in Examples 1 to 5 are 2- to 4-fold better than the Izod impact values of Comparative Examples 1 to 5 obtained by the injection molding method of the prior art.

TABLE 1

| Injection molding conditions | | Izod impact value (kg · cm/cm) | |
| --- | --- | --- | --- |
| Injection pressure (kg/cm²) | Injection rate (cm³/sec) | Example 1 | Comparative Example 1 |
| 280 | 16 | 5 | * |
| 840 | 50 | 5 | 2 |
| 1000 | 60 | 7 | 2 |
| 1120 | 65 | * | 2 |

TABLE 2

| Injection molding conditions | | Izod impact value (kg · cm/cm) | |
| --- | --- | --- | --- |
| Injection pressure (kg/cm²) | Injection rate (cm³/sec) | Example 2 | Comparative Example 2 |
| 280 | 10 | 45 | * |
| 280 | 16 | 43 | * |
| 560 | 33 | 45 | 12 |
| 1000 | 60 | * | 12 |

TABLE 3

| Injection molding conditions | | Izod impact value (kg · cm/cm) | |
| --- | --- | --- | --- |
| Injection pressure (kg/cm²) | Injection rate (cm³/sec) | Example 3 | Comparative Example 3 |
| 840 | 50 | 4 | 2 |
| 1000 | 60 | 7 | 2 |
| 1120 | 65 | * | 2 |

TABLE 4

| Example 4 | | Comparative Example 4 | |
| --- | --- | --- | --- |
| Mold temperature (°C.) | Izod impact value (kg · cm/cm) | Mold temperature (°C.) | Izod impact value (kg · cm/cm) |
| 160 | 7 | 85 | 2 |
| 155 | 8 | 70 | 2 |
| 150 | 8 | 54 | 2 |
| 140 | 7 | 40 | 2 |
| 130 | 7 | | |

TABLE 5

| Example 5 | | Comparative Example 5 | |
| --- | --- | --- | --- |
| Mold temperature (°C.) | Izod impact value (kg · cm/cm) | Mold temperature (°C.) | Izod impact value (kg · cm/cm) |
| 160 | 46 | 80 | 13 |
| 155 | 46 | 70 | 14 |
| 150 | 45 | 50 | 14 |
| 140 | 46 | 40 | 14 |
| 110 | 30 | | |

EXAMPLE 6

The same K-resin as used in Example 1 and Estyrene MS-200 (trade name, Nippon Steel Chemical, Japan), which is a styrene-methyl methacrylate copolymer containing 78% by weight of styrene, were formulated to a K-resin content of 75% by weight, and the composition was blended and pelleted at 220° C. by a partially intermeshing, counter-rotating twin screw extruder having a screw diameter of 20 mm and a ratio of screw effective length to screw diameter of 25 and pelletized. The pellets were charged into the injection molding machine used in Example 1, and injected at a barrel temperature of 240° C. and the injection pressure and rate shown in Table 6. The wall surface temperature at the core and the cavity portions within the mold was made 150° C. during the injection and filling, and cooled immediately after completion of the filling at a cooling rate of about 1° C./sec. to 40° C. before demolding the molded product. Izod impact test strips ¼ inch thick were V-notched and the impact values were measured according to ASTM D-256. The results are shown in Table 6.

EXAMPLE 7

Injection molded products were obtained in the same manner as in Example 6, except that the surface temperature of the core and cavity portions within the mold was 145° C. The relationship between the injection molding conditions and Izod values is shown in Table 6.

EXAMPLE 8

Injection molded products were obtained in the same manner as in Example 6, except that the surface temperature of the core and cavity portions within the mold was 140° C. The relationship between the injection molding conditions and Izod values is shown in Table 6.

COMPARATIVE EXAMPLE 6

The blended pellets used in Example 6 were charged into the injection molding machine used in Example 6 and injected at a barrel temperature of 240° C. at the injection pressure and injection rate shown in Table 6. The wall surface temperature of the core and cavity portions within the mold was made 40° C., which was constantly maintained during the molding step. Test strips were obtained and the Izod impact values were measured by the same method as in Example 6. The results are shown in Table 6.

TABLE 6

| Injection molding conditions | | Izod impact value (kg · cm/cm) | | | |
|---|---|---|---|---|---|
| Injection pressure (kg/cm²) | Injection rate (cm³/sec) | Example 6 | Example 7 | Example 8 | Comparative Example 6 |
| 200 | 10 | 13 | 15 | — | * |
| 280 | 10 | 32 | — | 23 | * |
| 280 | 16 | 35 | 20 | 15 | * |
| 370 | 16 | 24 | 16 | 10 | 5 |
| 370 | 22 | 24 | 15 | 10 | 5 |
| 470 | 27 | 17 | 12 | — | 5 |
| 560 | 33 | 12 | 10 | — | 6 |
| 840 | 50 | 23 | — | — | 6 |

EXAMPLE 9

K-resin KRO 5 and Estyrene MS-200 were formulated to a K-resin content of 85% by weight, and the composition was blended and pelletized under the same conditions as in Example 6. The pellets were charged into the injection molding machine used in Example 6, and injected at a barrel temperature of 240° C., and the injection pressure and rate shown in Table 7. The wall surface temperature at the core and the cavity portions within the mold was made 150° C. during the injection and filling, and cooled immediately after completion of filling at a cooling rate of about 1° C./sec. to 40° C., before demolding the molded products. Injection molded test strips were obtained and the Izod impact values were measured by the same method as in Example 6. The results are shown in Table 7.

COMPARATIVE EXAMPLE 7

The blended pellets used in Example 9 were charged into the injection molding machine used in Example 6 and injected at a barrel temperature of 240° C. at the injection pressure and rate shown in Table 7. The wall surface temperature of the core and cavity portions within the mold was made 40° C., which was constantly maintained during the molding step. Test strips were obtained and the Izod impact values were measured by the same method as in Example 6. The results are shown in Table 7.

TABLE 7

| Injection molding conditions | | Izod impact value (kg · cm/cm) | |
|---|---|---|---|
| Injection pressure (kg/cm²) | Injection rate (cm³/sec) | Example 9 | Comparative Example 7 |
| 280 | 10 | 29 | * |
| 280 | 16 | 31 | * |
| 280 | 22 | 25 | 2 |
| 370 | 22 | — | 2 |

EXAMPLE 10

Injection molded products were obtained in the same manner as in Example 9, except for formulating K-resin KRO 5 and Estyrene MS-200 to a K-resin content of 65% by weight. The relationship between the injection molding conditions and the Izod impact values is shown in Table 8.

COMPARATIVE EXAMPLE 8

The blended pellets used in Example 10 were charged into an injection molding machine used in Example 6, and injected at a barrel temperature of 240° C., at the injection pressure and rate shown in Table 8. The wall surface temperature of the core and cavity portions within the mold was made 40° C., which was constantly maintained during the molding step. The Izod impact values of these injection molded test strips are shown in Table 8.

TABLE 8

| Injection molding conditions | | Izod impact value (kg · cm/cm) | |
|---|---|---|---|
| Injection pressure (kg/cm²) | Injection rate (cm³/sec) | Example 10 | Comparative Example 8 |
| 280 | 10 | 19 | * |
| 280 | 16 | 27 | 2 |
| 280 | 22 | 22 | 2 |

EXAMPLE 11

The blended pellets used in Example 6 were charged into the injection molding machine used in Example 6 and injected at a barrel temperature of 240° C. an injection pressure of 300 kg/cm² and an injection rate of 16 cm³/sec. The wall surface temperature of the core and cavity portions within the mold during the injection and filling was as shown in Table 9 and cooled immediately after completion of the filling at a rate of about 1° C./sec. to 40° C., before demolding the molded products. The Izod impact values of these products are shown in Table 9.

COMPARATIVE EXAMPLE 9

The blended pellets used in Example 6 were charged into the injection molding machine used in Example 6, and injected at a barrel temperature of 240° C. at an injection pressure of 350 kg/cm² and injection rate of 20 cm³/sec. The wall surface temperature at the core and cavity portions within the mold was made lower than the glass transition temperature (about 95° C.) of the styrene polymer moiety of K-resin, as shown in Table 9, which mold temperature was maintained during the molding cycle. The Izod impact values of these injection molded test strips are shown in Table 9.

TABLE 9

| | Mold temperature (°C.) | Izod impact value (kg · cm/cm) |
| --- | --- | --- |
| Example 11 | 160 | 40 |
| | 150 | 34 |
| | 145 | 19 |
| | 140 | 19 |
| | 120 | 12 |
| Comparative | 85 | 8 |
| Example 9 | 72 | 7 |
| | 61 | 8 |
| | 54 | 7 |
| | 40 | 5 |

EXAMPLE 12

The same Asaflex as used in Example 2 and Estyrene MS-200 were formulated to an Asaflex content of 75% by weight, and the composition was blended and pelletized by the same method and under the same conditions as in Example 6. The pellets were charged into the injection molding machine used in Example 6 and injected at a barrel temperature of 240° C. and the injection pressure and rate shown in Table 10. The wall surface temperature at the core and the cavity portions within the mold was made 150° C. during the injection and filling, and cooled immediately after completion of the filling at a cooling rate of about 1° C./sec. to 40° C., before demolding the molded products. Injection molded test strips were obtained and the Izod impact values were measured by the same method as in Example 6. The results are shown in Table 10.

COMPARATIVE EXAMPLE 10

The blended pellets used in Example 12 were charged into an injection molding machine used in Example 6 and injected at a barrel temperature of 240° C. at the injection pressure and rate shown in Table 10. The wall surface temperature of the core and cavity portions within the mold was made 40° C., which was constantly maintained during the molding step. The Izod impact values of these injection molded test strips are shown in Table 10.

TABLE 10

| Injection molding conditions | | Izod impact value (kg · cm/cm) | |
| --- | --- | --- | --- |
| Injection pressure (kg/cm$^2$) | Injection rate (cm$^3$/sec) | Example 12 | Comparative Example 10 |
| 280 | 10 | 46 | * |
| 280 | 16 | 46 | * |
| 560 | 33 | 45 | 17 |
| 680 | 44 | — | 17 |

EXAMPLE 13

Injection molded products were obtained in the same manner as in Example 12, except for formulating Asaflex 810 and Estyrene MS-200 to an Asaflex content of 85% by weight. The relationship between the injection molding conditions and the Izod impact values is shown in Table 11.

COMPARATIVE EXAMPLE 11

The blended pellets used in Example 13 were charged into the injection molding machine used in Example 6 and injected at a barrel temperature of 240° C. at the injection pressure and rate shown in Table 11. The wall surface temperature of the core and cavity portions within the mold was made 40° C., which was constantly maintained during the molding step. The Izod impact values of these injection molded test strips are shown in Table 11.

TABLE 11

| Injection molding conditions | | Izod impact value (kg · cm/cm) | |
| --- | --- | --- | --- |
| Injection pressure (kg/cm$^2$) | Injection rate (cm$^3$/sec) | Example 13 | Comparative Example 11 |
| 280 | 10 | 47 | * |
| 280 | 16 | 46 | * |
| 560 | 33 | — | 9 |
| 680 | 44 | — | 9 |

EXAMPLE 14

The same Clearene as used in Example 3 and Estyrene MS-200 were formulated to a Clearene content of 75% by weight, and the composition was blended and pelletized by the same method and under the same conditions as in Example 6. The pellets were charged into the injection molding machine used in Example 6 and injected at a barrel temperature of 240° C. and the injection pressure and rate shown in Table 12. The wall surface temperature at the core and the cavity portions within the mold was made 150° C. during the injection and filling, and cooled immediately after completion of the filling at a cooling rate of about 1° C./sec. to 40° C., before demolding the molded products. Injection molded test strips were obtained and the Izod impact values were measured by the same method as in Example 6. The results are shown in Table 12.

COMPARATIVE EXAMPLE 12

The blended pellets used in Example 14 were charged into the injection molding machine used in Example 6 and injected at a barrel temperature of 240° C. at the injection pressure and rate shown in Table 12. The wall surface temperature of the core and cavity portions within the mold was made 40° C., which was constantly maintained during the molding step. The Izod impact values of these injection molded test strips are shown in Table 12.

TABLE 12

| Injection molding conditions | | Izod impact value (kg · cm/cm) | |
| --- | --- | --- | --- |
| Injection pressure (kg/cm$^2$) | Injection rate (cm$^3$/sec) | Example 14 | Comparative Example 12 |
| 280 | 16 | 4 | 2 |
| 280 | 22 | 5 | 2 |
| 470 | 27 | 6 | 2 |
| 840 | 50 | 11 | 2 |

EXAMPLE 15

K-resin KRO 5 and Estyrene AS-30 (trade name, Nippon Steel Chemical, Japan), which is a styrene-acrylonitrile random copolymer containing 71% by weight of styrene, were formulated to a K-resin content of 75% by weight, and the composition was blended and pelletized in the same manner as in Example 6. The pellets were charged into the injection molding machine used in Example 6 and injected at a barrel temperature of 240° C. and the injection pressure and rate shown in Table 13. The wall surface temperature at the core and the cavity portions within the mold was made 150° C. during the injection and filling, and cooled immediately after completion of the filling at a cooling rate of about 1° C./sec. to 40° C., before demolding the molded products. Injection molded test strips, Izod impact values were measured by the same method as in Example 6. The results are shown in Table 13.

COMPARATIVE EXAMPLE 13

The blended pellets used in Example 15 were charged into an injection molding machine used in Example 6 and injected at a barrel temperature of 240° C. at the injection pressure and rate shown in Table 13. The wall surface temperature of the core and cavity portions within the mold was made 40° C., which was constantly maintained during the molding step. The Izod impact values of these injection molded test strips are shown in Table 13.

TABLE 13

| Injection molding conditions | | Izod impact value (kg · cm/cm) | |
|---|---|---|---|
| Injection pressure (kg/cm$^2$) | Injection rate (cm$^3$/sec) | Example 15 | Comparative Example 13 |
| 280 | 16 | 6 | * |
| 370 | 22 | 7 | 3 |
| 560 | 33 | 7 | 2 |
| 840 | 50 | 8 | 2 |

As apparent from Tables 6 to 13, the Izod impact values of the injection molded products obtained in Examples 6 to 15 were very high and exceeded 30 kg-cm/cm at the maximum, and were 1.5-fold to 5-fold or more better than the Izod impact values of the molded products of Comparative Examples 6 to 13 obtained by the injection molding method of the prior art, wherein the mold temperature is made constant.

When a molding material of a styrene-conjugated diene copolymer with a high styrene content is molded by the injection molding method of the present invention, the Izod impact value of the molded product is improved 2-fold to 4-fold compared with the Izod impact value of the molded product obtained by the injection molding method of the prior art.

When an injection molding material of a resin composition of a styrene-conjugated diene copolymer which forms the matrix containing a styrene resin other than said styrene-conjugated diene copolymer dispersed therein is molded by the injection molding method of the present invention, the Izod impact value exceeds 30 kg-cm/cm at the maximum.

Thus, in either case mentioned above, injection molded products having an extremely high impact resistance comparable with expensive engineering plastics are obtained, and a great contribution can be made thereby to an expansion of uses of the styrene-conjugated diene block copolymers.

We claim:

1. A method of injection molding a styrene resin or a composition thereof, which comprises injection molding a molten molding resin material of a styrene-conjugated diene block copolymer containing 50% to 90% by weight of a styrene polymer or a molten molding resin material of a resin composition comprising 50% by weight or more of said styrene-conjugate diene block copolymer and 50% by weight or less of a styrene resin other than said styrene-conjugated diene block copolymer, wherein the injection molding is carried out at a barrel temperature of 180° to 250° C., and wherein said molten resin is injected and filled into a mold with a wall surface temperature of 110° C. to 180° C. at core and cavity portions within the mold, and the resin is cooled at a speed of not lower then 0.3° C./sec. after being filled into the mold, and the molded product is demolded when the wall surface temperature of the core and cavity portions is lowered to the glass transition temperature or lower of the styrene polymer moiety in said block copolymer or a temperature of not higher then 90° C.

2. A method according to claim 1, wherein the block copolymer is a radially branched type block copolymer represented by the formula X+B—S)$_m$ in which S is a polymer block comprising styrene, B is a polymer block comprising primarily conjugated diene, X is the portion of a polyfunctional coupling agent used for formation of the radially branched type polymer from which all the functional groups are eliminated, and m is an integer of 3 or more.

3. A method according to claim 1, wherein the block copolymer is a linear block copolymer represented by the formula S+B—S)$_n$B—S or S+B—S)$_n$B in which S is a polymer block comprising styrene, B is a polymer block comprising primarily conjugated diene, and n is 0 or an integer of 1 or more.

4. A method according to claim 1, wherein the conjugate diene is selected from 1,3-butadiene, 2-methyl-1,3-butadiene, 2,3-dimethyl-1,3-butadiene, 1,3-pentadiene and 1,3-hexadiene.

5. A method according to claim 1, wherein the styrene resin other than said styrene-conjugated diene block copolymer in the molten molding resin material of said resin composition is selected from polystyrene, copolymers of styrene with a styrene derivative, copolymers of styrene with a methacrylate ester, maleic anhydride or acrylonitrile, rubber-modified impact resistant polystyrene, styrene-conjugated diene block copolymers of a styrene content of 70% by weight or more, and acrylonitrile-styrene-butadiene copolymer.

* * * * *